Feb. 16, 1960  T. L. BROWN ET AL  2,925,573
WEIGHT INDICATORS
Filed Oct. 20, 1958

INVENTOR.
Thomas L. Brown
Jack R. Hulme
BY
Earl Babcock
ATTORNEY

United States Patent Office 2,925,573
Patented Feb. 16, 1960

2,925,573

WEIGHT INDICATORS

Thomas L. Brown and Jack R. Hulme, Duncan, Okla., assignors to Halliburton Oil Well Cementing Company, Duncan, Okla.

Application October 20, 1958, Serial No. 768,377

2 Claims. (Cl. 338—47)

This invention relates to weight indicators and more particularly to means for weighing heavy material such as bulk cement or the like.

It is old in the art, as in the United States patent to Frey et al., No. 2,213,982 of September 10, 1940, to provide sensitive electrical means responsive to bending of a beam carrying a heavy load of bulk material so as to obtain an indication of its weight.

The present invention is directed to improvements in such a weighing system in which a variable electrical device is enclosed in a unitary housing or cell mounted between adjustable cantilever beams in the legs of a heavy frame supporting bulk cement or the like, and in which provision is made for ready calibration after installation so as to provide a practical and rugged arrangement.

The objects of the invention will be apparent to those skilled in the art from what has been said above, and from the following detailed description, when taken in connection with the accompanying drawing, in which.

Figure 1:
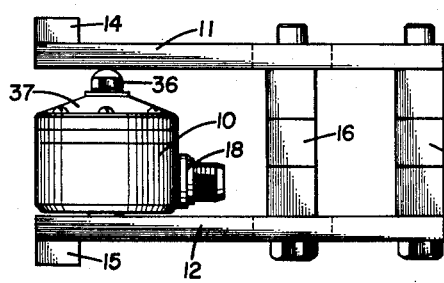
Figure 1 is a side view of an assembly of cantilever beams and a cell constructed in accordance with the invention, and which is suitable for mounting in the leg of a supporting frame of a bulk cement storage bin.

Referring to the drawing in detail, and first to the assembly shown in Figure 1, it will be seen that a cell 10 is mounted between two cantilever beams 11 and 12. The beams are connected at one end by a yoke 13 while their opposite free ends are provided with blocks 14 and 15.

The assembly of Figure 1 may be mounted in and form part of a frame supporting a heavy load, the blocks 14 and 15 being used to attach the same, and serving as the load transmitting means. In practice four such assemblies have been mounted in the four legs of a frame supporting a bulk cement storage bin, with the electrical elements of the cell 10 so connected to a battery and an electrical indicator, in accordance with a known circuit, as to indicate the total weight of the cement in the bin. Various ways of utilizing the assembly of Figure 1 will be apparent to those skilled in the art and need not be described here in detail.

It is preferable to have the length of the cantilever beams 11 and 12 adjustable, and the spacing yoke 16 is provided for this purpose. The beams are provided with suitable slots, shown in dotted lines in Figure 1, so that the yoke 16 may be moved closer to the yoke 13 or away from it, as desired. This adjustment, of course, changes the amount of deflection of the beams under a given load or stress imparted thereto by the blocks 14 and 15 as they are forced toward each other by the load.

Figure 2:
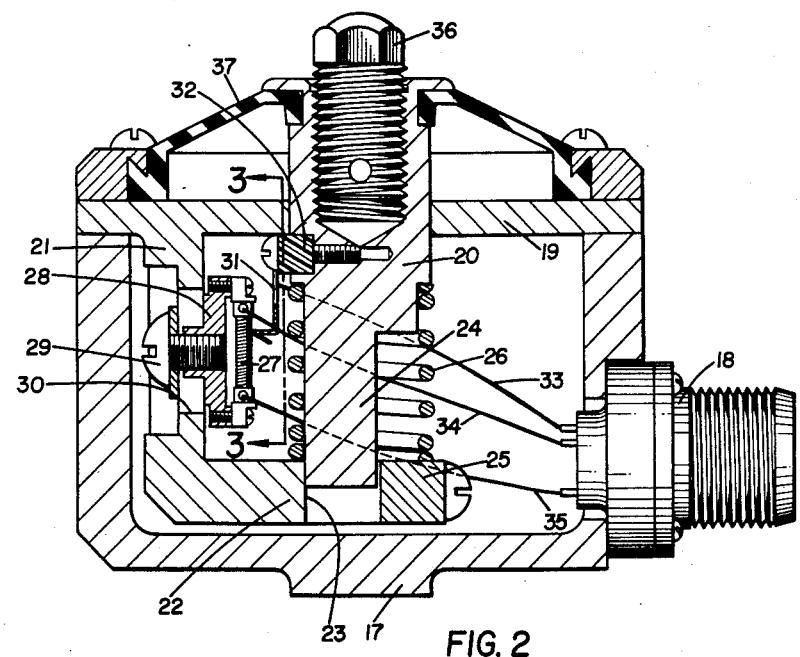
Figure 2 is an enlarged detail view in vertical cross section of the cell shown in Figure 1.
Figure 3:
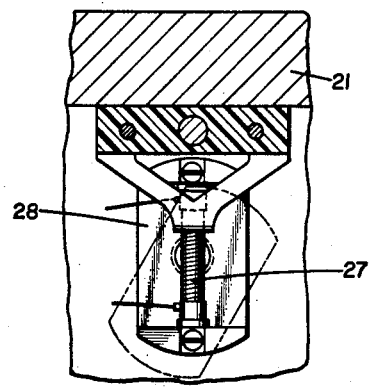
Figure 3 is a side view, taken along the line 3—3 of Figure 2, of the resistor and wiper used in the cell of Figures 1 and 2.

The cell 10 may be constructed as shown in detail in Figures 2 and 3. A cup-shaped housing is provided with a base 17, and with an insulating plug 18 suitable for the passage of wires therethrough.

A lid 19 is provided for the cup-shaped housing. The lid 19 has a central hole therein through which a plunger 20 extends, so that it can move up and down in the cup-shaped housing.

The lid 19 also has a depending supporting and guiding structure 21, with a lateral portion 22.

The lateral portion 22 is provided with a slot 23 which cooperates with a non-circular shaped extension 24 on the lower end of the plunger 20, so as to prevent the plunger from turning with respect to the housing while permitting it to move freely up and down. A bar 25 may be secured to the portion 22 to close the slot 23.

A coil spring 26 is provided between the lateral portion 22 and a shoulder on the plunger 20 to urge the plunger 20 upwardly at all times, but this spring 26 is too weak to have any material effect insofar as weighing the load is concerned since the force it exerts is insignificant.

The depending structure 21 of the lid 19 also serves as a mounting means for a resistor element 27. This element may consist of a cylindrically wound coil of extremely fine wire. It is mounted on a rectangular frame 28 which is clamped to the structure 21 by a screw 29. The screw 29 extends through a slot 30, and it will be seen that the frame 28 and the resistor 27 can thus be readily adjusted, as to position, not only as to angular position, but also up and down. Figure 3 shows, in dotted lines, the frame 28 not only tilted, but also lowered, from the position shown in full lines.

The plunger 20 is provided with a wiper 31 which is adapted to slide along the resistor 27 when the plunger moves up and down in the cell 10. It will be seen in Figure 3 that this wiper has a rather wide contact blade so that it can sweep the resistor even though the latter is tilted.

The wiper 31 is connected to the plunger by an insulating support 32 and a wire 33 connects it to one of the conductors of the plug 18.

The top and bottom of the resistor coil 27 are connected to other conductors of the plug 18 by wires 34 and 35.

The plunger 20 is provided with an adjustable jack screw 36 for engaging the under surface of the upper cantilever beam 11 as shown in Figure 1.

A rubber flexible diaphragm 37 may be provided to keep the interior of the cell clean.

The operation of the assembly will be readily apparent. As load is applied, the blocks 14 and 15 move toward each other, this movement being resisted by strain in the cantilever beams 11 and 12.

As the free ends of the beams move toward each other, the plunger 20 moves down and causes the wiper 31 to slide downwardly on the resistor 27. If the resistor is used as a potentiometer, this varies the voltage drop between the wiper and the two ends of the resistor 27 and this serves as a ready means for transmitting a signal to a remote point in accordance with standard electrical practice.

Of course, the resistor 27 may have only one of its conductors 34, 35 connected to the electrical measuring system, the flow of current then being from the wire 33 to the wiper 31, a segment of the resistor and whichever conductor 34, 35 in use, the measuring system then being responsive to a straight change in resistance as the plunger 20 moves.

To calibrate the weighing device, the yoke 16 may be adjusted to change the characteristics of the cantilever levers 11 and 12, and the position of the resistor 27 can be changed over a wide range.

By moving the resistor 27 up and down, the ratio of the resistance above the contact blade of the wiper 31 to that below it, in the zero position (that shown in Figure 2), can readily be varied.

By turning the frame 28 and the resistor 27 out of vertical any desired amount, the number of turns of wire on the resistor element traversed by the blade of the wiper 31 for a unit distance of vertical movement can readily be varied, and this permits of a nice correlation between the movement of the free ends of the cantilever beams and the electrical characteristics of the measuring circuit in which the resistor 27 is connected.

Various means other than that shown may, of course, be provided to adjust the position of the resistor 27. Other changes may also be made in the construction and arrangement of parts without departing from the spirit of the invention.

We claim:

1. In a weight indicator suitable for use for weighing heavy material such as bulk cement, the combination with a frame of a supporting structure for such material of two cantilever beams, a yoke connecting one end of each beam to one end of the other beam, means for subjecting the beams to load at their free ends, an electrical cell located between said beams and consisting of a cup-shaped housing with a plunger adapted to move therein in response to movement of said beams under the load, an electrical resistor and a wiper mounted in said cup-shaped housing in such manner that as the plunger moves therein, the electrical characteristics of said resistor are modified, said resistor being mounted for both vertical and angular adjustment, whereby the cell can readily be calibrated with load conditions.

2. The combination defined in claim 1 in which the cantilever beams are provided with a second yoke spaced from the first mentioned yoke and adjustable as to the distance from said first mentioned yoke, whereby the characteristics of said beams under load can be readily modified.

References Cited in the file of this patent

UNITED STATES PATENTS

| | | |
|---|---|---|
| 1,528,627 | Peters | Mar. 3, 1925 |
| 2,617,912 | Colvin | Nov. 11, 1952 |
| 2,256,473 | De Giers | Sept. 23, 1941 |
| 2,746,289 | Cline | May 22, 1956 |